United States Patent [19]
Beatty et al.

[11] 3,977,906
[45] Aug. 31, 1976

[54] FLAT ALKALINE CELL WITH POSITIVE AND NEGATIVE TERMINAL CONNECTIONS AND A THIRD TERMINAL CONNECTION FOR AN AUXILIARY ELECTRODE

[75] Inventors: Theodore R. Beatty, Bay Village; Harry Vourlis, Lakewood, both of Ohio

[73] Assignee: Union Carbide Corporation, New York, N.Y.

[22] Filed: Mar. 17, 1975

[21] Appl. No.: 559,074

Related U.S. Application Data

[63] Continuation-in-part of Ser. No. 456,837, April 1, 1974.

[52] U.S. Cl. .......................... 136/111; 136/135 R; 136/132
[51] Int. Cl.² .................................... H01M 21/00
[58] Field of Search............ 136/111, 3, 135 R, 175, 136/166, 132, 133

[56] References Cited
UNITED STATES PATENTS

| | | | |
|---|---|---|---|
| 2,870,235 | 1/1959 | Soltis | 136/111 |
| 2,995,614 | 8/1961 | Krueger | 136/111 |
| 3,597,276 | 8/1971 | Jammet | 136/111 |
| 3,708,340 | 1/1973 | Tamminen | 136/111 |

*Primary Examiner*—Anthony Skapars
*Attorney, Agent, or Firm*—Eugene Lieberstein

[57] ABSTRACT

A flat alkaline cell is described wherein an electrode assembly including at least a pair of flat electrode elements of opposite polarity having a porous separator containing an alkaline electrolyte interposed therebetween and a current collector disposed adjacent to and in electrical connection with one of the pair of electrode elements at one end of the electrode assembly, are enclosed within a sealed, liquid impervious plastic film envelope having an opening in one wall thereof which exposes at least a portion of the current collector for making external electrical connection therewith, and wherein a layer of an adhesive sealant which is non-wettable by the alkaline electrolyte, tightly adheres and seals together the current collector and the wall of the envelope at least around the periphery of the opening. The exposed portion of the current collector constitutes a first terminal connection to which a wire lead or the like may be attached. A second and third terminal connection are provided in the sealed envelope, the former being in electrical connection with the other of the pair of electrode elements of opposite polarity and the latter being in electrical connection with an auxiliary electrode.

20 Claims, 10 Drawing Figures

FLAT ALKALINE CELL WITH POSITIVE AND NEGATIVE TERMINAL CONNECTIONS AND A THIRD TERMINAL CONNECTION FOR AN AUXILIARY ELECTRODE

PRIOR APPLICATIONS

This application is a Continuation-In-Part of our copending U.S. application Ser. No. 456,837, filed Apr. 1, 1974.

BACKGROUND OF THE INVENTION

This invention relates to flat alkaline cells in general, and more particularly to a flat alkaline cell construction wherein the active elements are enclosed within a sealed, liquid-impervious plastic film envelope and wherein the envelope is provided with both positive and negative terminal connections and a third terminal connection for an auxiliary electrode.

In our copending application Ser. No. 456,837 entitled "Flat Alkaline Cell Construction," filed Apr. 1, 1974, of which this application is a Continuation-In-Part, there is disclosed and claimed a flat alkaline cell wherein at least a pair of flat electrode elements of opposite polarity having a porous separator containing an alkaline electrolyte interposed therebetween are arranged in the form of a conventional electrode stack assembly. A current collector which may be a flat metal plate or foil is disposed adjacent to and in electrical connection with one of the pair of electrode elements at one end of the electrode assembly. The electrode assembly is enclosed within a sealed, liquid-impervious plastic film envelope having an opening in one wall thereof exposing at least a portion of the current collector. A thin layer of an adhesive sealant is interposed at the interface between the current collector and the inner surface of the wall of the sealed envelope surrounding the opening. This layer of adhesive sealant tightly adheres and seals together the collector and the envelope wall and prohibits leakage of the alkaline electrolyte through the opening from inside the cell. Preferably, the layer of adhesive sealant covers substantially the entire face of the current collector, except for a small area coinciding with the opening in the wall. Suitable means may be provided for making external electrical connection with the exposed portion of the current collector such as by attaching a wire lead thereto.

Alkaline electrolytes are notoriously known for their ability to readily wet most metal and plastic surfaces and to creep seals conventionally used in current-producing electrochemical cells. Our flat cell construction as described above effectively solves this problem through the use of an adhesive sealant which is non-wettable by the alkaline electrolyte. The thin layer of adhesive sealant used to tightly bond the current collector to the wall of the plastic film envelope actually resists creepage of the electrolyte past the sealing interfaces and out through the opening in the wall. Preferably, the adhesive sealant is chosen from the class of compounds known as "fatty polyamides," although other adhesive sealants which are not readily wet by the alkaline electrolyte can also be used.

Still another advantage of our flat cell construction resides in the provision of an extended leakage path over which the electrolyte must travel in order to escape from the cell. This extended leakage path comprises the sealing interface between the current collector and the inner surface of the wall of the sealed envelope, i.e., the leakage path traverses the shortest distance from the opening over the width or length of the collector.

In a typical flat cell construction made in accordance with our above-referred to copending application, the sealed envelope is advantageously formed by a heat shrinkable plastic film tube which is heat shrunk down around the side walls of the electrode assembly and which overlaps the marginal borders of a pair of flat current collectors, one of each of which is disposed adjacent to an end of the electrode assembly. The pair of current collectors and the portion of the heat shrunk tube overlapping the marginal borders are tightly adhered together by a thin layer of the non-wetting adhesive sealant. The centermost portion of one of the pair of current collectors which is left exposed at one end of the electrode assembly constitutes the positive terminal connection while the centermost portion of the other of the pair of collectors which is left exposed at the opposite end of the electrode assembly constitutes the negative terminal connection of the cell. The arrangement of the terminal connections is such that a plurality of the individual flat cells may be stacked together with the positive terminal connection of one cell making electrical connection with the negative terminal connection of an adjacent cell via a wire lead or the like attached thereto to constitute a series-connected battery. Flat cells with this arrangement of the terminal connections can also be assembled into parallel and series-parallel connected batteries.

It has already been proposed in the prior art to employ so-called "auxiliary electrodes" in current-producing electrochemical cells. These auxiliary electrodes are used in conjunction with the working electrodes, i.e., positive and negative electrodes, to perform certain valuable functions in operation of the cells. Such auxliary electrodes have been used, for instance, in rechargeable cells to detect or sense the presence of excessive amounts of either oxygen or hydrogen gas that may be generated under certain conditions such as when the cells are overcharged.

In U.S. Pat. No. 3,462,303 to H. Reber, there is disclosed a sealed rechargeable cell wherein an auxiliary electrode is maintained in contact with a gas space and a liquid electrolyte. The auxiliary electrode will form with the negative electrode of the cell a voltage differential the value of which will be dependent on the partial oxygen pressure in the gas space of the sealed cell. When the cell is subjected to overcharging, the partial oxygen pressure in the gas space will rise, a change in the voltage differential will occur and this change is utilized for actuating control devices for terminating the charging current and thereby prohibiting the build-up of an excessive gas pressure inside the cell.

Basically the same auxiliary electrode arrangement may be used in a rechargeable cell such as described above to sense the presence of hydrogen gas in the cell. In this instance, the auxiliary electrode which will form with the positive electrode of the cell a voltage differential whose value will be dependent on the partial hydrogen pressure in the gas space under conditions where hydrogen gas may be evolved during operation of the cell.

Auxiliary electrodes may also be incorporated in current-producing electrochemical cells as a voltage reference device. It is possible for instance to electrochemically couple the positive or negative electrode of a rechargeable nickel-cadmium cell to an auxiliary reference electrode and study the discharge behavior of either electrode independently of the other. Auxiliary electrodes in these applications are a valuable tool to the researcher since he can carry out his studies without having to dismantle the cell construction.

Provision must of course be made in the sealed assembly of the current-producing electrochemical cell for making external electrical connection with the auxiliary electrode. Such means usually comprises a separate or third terminal connection in the sealed assembly in addition to both the positive and negative terminal connections. Basically the same type of construction is used for the third terminal connection regardless of whether the auxiliary electrode is employed as an oxygen or hydrogen sensing electrode or voltage reference electrode.

The principle object of this invention is the provision of a flat alkaline cell construction of the character described in our above-referred to copending application wherein there is provided both positive and negative terminal connections in at least one wall of the plastic film envelope together with a third terminal connection for an auxiliary electrode.

SUMMARY OF THE INVENTION

This invention resides in a flat alkaline cell construction wherein at least a pair of flat electrode elements of opposite polarity having a porous separator containing an alkaline electrolyte interposed therebetween are arranged in the form of a conventional electrode stack assembly. A current collector which may be a flat metal plate or foil is disposed adjacent to and in electrical connection with one of the pair of electrode elements at one end of the electrode assembly. The electrode assembly is enclosed within a sealed envelope made of a liquid impervious plastic film and preferably a plastic film which is electrically non-conductive. The sealed envelope is formed with an opening in one wall thereof which exposes at least a portion of the current collector for making external electrical connection therewith. A thin layer of an adhesive sealant which is non-wettable by the alkaline electrolyte, is interposed at the interface between the current collector and the inner surface of the wall of the sealed envelope surrounding the opening. The layer of adhesive sealant tightly adheres and seals together the collector and the envelope wall and prohibits leakage of the alkaline electrolyte through the opening from inside the cell. Preferably, the layer of adhesive sealant covers substantially the entire face of the current collector, except for a small area coinciding with the opening in the wall. Although other non-wetting adhesive sealants may be used in the practice of the invention, the preferred adhesive sealant is a sealant formulated from the general class of compounds known as "fatty polyamides." The fatty polyamides used in the sealant preferably should have an amine number of above about 9.

The sealed collector assembly described above constitutes a first terminal connection for the cell. A second and third terminal connection are provided in the sealed envelope in accordance with the invention, one or both of which may constitute basically the same type of structure as used in the first terminal connection. The second terminal connection may be made using another current collector disposed adjacent to the other of the pair of electrode elements of opposite polarity at the opposite end of the electrode assembly. This current collector is tightly adhered and sealed to the wall of the envelope by a thin layer of the same non-wetting adhesive sealant applied around another opening in the wall which exposes a portion of the current collector. Suitable means may be provided for making external electrical connection with the current collectors of both the first and second terminal connections such as by attaching a wire lead thereto. The third terminal connection for the cell may be made in basically the same manner or alternatively by extending a wire lead out through a leak-proof seam in the instance where the sealed envelope is closed by sealing together edges or marginal borders of the plastic film such as by a heat seal. The first and second terminal connections so formed are maintained in electrical connection with the pair of electrode elements of opposite polarity and constitute both the positive and negative terminal connections for the cell. The third terminal connection is maintained in electrical connection with an auxiliary electrode inside the cell which may be an oxygen or hydrogen sensing electrode or an auxiliary voltage reference electrode, for example.

Although the invention is widely applicable to flat alkaline cell constructions in general, it will be more fully described hereinafter with particular reference to a rechargeable nickel-cadmium cell. Such a rechargeable nickel-cadmium cell comprises a positive electrode containing an electrochemically oxidizable active material such as nickel hydroxide, a negative electrode containing an electrochemically reducible active material such as cadmium oxide or cadmium hydroxide, and a porous bibulous separator containing the alkaline electrolyte interposed between and in contact with both the positive and the negative electrodes. The positive and negative electrodes will be so balanced electrochemically with the active materials as to prohibit the generation of excessive gas or gases upon overcharge of the cell. It will be understood, of course, that the flat alkaline cell construction of the invention may utilize other electrode systems such as the zinc/manganese dioxide system as will readily occur to those skilled in the art.

The invention will be hereinfurther described in detail by reference to the specific embodiments of the flat cell construction illustrated in the accompanying drawings.

DESCRIPTION OF THE PREFERRED EMBODIMENTS

Figure 1:
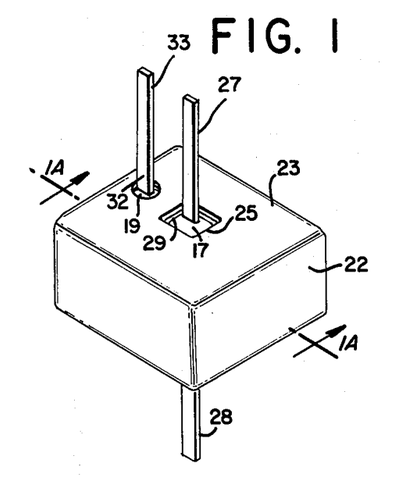
FIG. 1 is a perspective view of one embodiment of the flat alkaline cell construction of the invention.
Figure 1A:
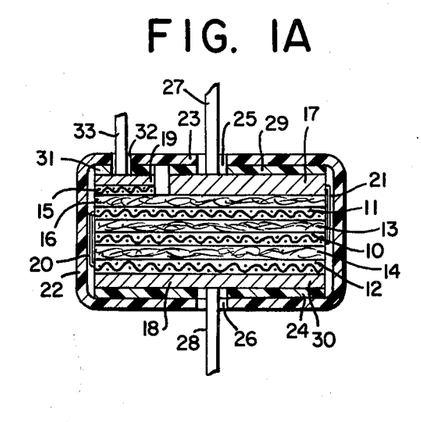
FIG. 1A is a cross-sectional view of the flat cell illustrated in FIG. 1, taken along the line 1A—1A.

FIGS. 1 and 1A illustrate a rechargeable flat nickel-cadmium cell made in accordance with the invention. The cell comprises a positive electrode plate 10, a pair of negative electrode plates 11, 12, one of each of which is disposed on each side of the positive electrode plate 10, porous separators 13, 14 containing an alkaline electrolyte sandwiched between and in facial contact with the positive electrode plate 10 and each of the pair of negative electrode plates 11, 12, the arrangement of the electrodes and separators forming a conventional electrode stack assembly. An auxiliary electrode 15 which is smaller in size than the positive electrode plate 10 and the negative electrode plates 11, 12, is positioned over the left hand side of the electrode assembly adjacent to the negative electrode plate 11 but separated therefrom by a porous separator 16. The positive electrode plate 10, negative electrode plates 11, 12 and the separators 13, 14 and 16 are rectangular in shape and are of substantially the same size such that the electrode plates and separators are stacked congruently. Both the positive electrode plate 10 and negative electrode plates 11, 12 may be sintered type electrodes fabricated from a sintered metal plaque which may be made, for example, by sintering a layer of metal powder, e.g., nickel, onto both sides of an open or porous substrate such as a nickel screen, which serves as a mechanical support and electrical path. The sintered metal plaque is impregnated with the electrochemically active material in accordance with conventional methods well known in the art. The porous separators 13, 14 and 16 containing the alkaline electrolyte may be made from a conventional separator material such as a non-woven organic fiber matte. A preferred type is made from nylon fiber under the tradename "Pellon." The alkaline electrolyte used in the cell may be, for example, a 30 percent by weight solution of potassium hydroxide.

At each end of the electrode assembly is provided one of a pair of current collectors 17, 18. The current collector 17 is also smaller in size than the positive electrode plate 10 and negative electrode plates 11, 12 but is larger than the auxiliary electrode 15 and overlies substantially more than half of the electrode assembly. A third current collector 19 is positioned over and in contact with the auxiliary electrode 15. Auxiliary electrode 15 and the current collector 19 which is substantially the same size as the auxiliary electrode 15, are spaced apart from the current collector 17 at one end of the electrode assembly. The current collector 18 is positioned in contact with the negative electrode plate 12 at the opposite end of the electrode assembly. The pair of negative electrode plates 11, 12 are electrically interconnected by an insulated metal conductor 20 and the positive electrode plate 10 is electrically interconnected to the current collector 17 also by an insulated metal conductor 21. The current collectors 17, 18 and 19 are made from an electrically conductive metal, preferably in the form of thin metal foil, which is inert to the alkaline electrolyte such as nickel or nickel plated steel.

All of the cell elements as described above are sealed within a liquid-impervious, electrically nonconductive, plastic film envelope 22. The envelope 22 fits tightly around the side walls of the electrode assembly and also around the opposite ends thereof forming a pair of end walls 23, 24. The end wall 23 completely covers the current collector 19 but does not completely overlap the current collector 17 but rather leaves an opening 25 which exposes a portion of the current collector 17. Similarly, the end wall 24 does not completely overlap the current collector 18 but leaves the center thereof exposed forming an opening 26. As shown in both FIGS. 1 and 1A, a metal terminal lead 27 is secured such as by welding to the exposed portion of the current collector 17 which constitutes the positive terminal for the cell. A metal terminal lead 28 is secured to the exposed portion of the current collector 18 which constitutes the negative terminal for the cell.

Substantially the entire outer surface of each of the pair of current collectors 17, 18 except for the exposed portion thereof, are coated with a thin layer 29, 30, respectively, of an adhesive sealant in accordance with the invention. Similarly, the entire outer surface of the current collector 19, except for a portion at the center which is to be left exposed, is coated with a layer 31 of the same adhesive sealant. The layers 29, 30 and 31 of adhesive sealant tightly seal the interfaces between each of the pair of end walls 23, 24 of plastic film and the current collectors 17, 18 and 19 against leakage of alkaline electrolyte. Suitably, the adhesive sealant should be an organic resin which will adhesively bond to both the plastic film and metal collectors. Preferably the adhesive sealant employs a fatty polyamide which is chemically resistant to and not readily wet by the alkaline electrolyte. The layers of adhesive sealant are first applied as a thin layer over the outer surface of each of the collectors 17, 18 and 19.

The side wall 23 is formed with an opening 32 which coincides with the exposed center of the current collector 19. A third terminal lead 33 passes through the opening 32 and is attached as by welding to the current collector 19 which constitutes a third terminal connection for the auxiliary electrode 15.

The envelope 22 is made from a tubular heat shrinkable plastic film such as a vinyl film. In assembly of the cell, the positive electrode plate 10 and the pair of negative plates 11, 12, the separators 13, 14 and 16, auxiliary electrode 15 and current collectors 17, 18 and 19 are first stacked together in the manner as described above and then inserted inside the heat shrinkable tube with the outer ends of the tube protruding beyond the coated current collectors. The plastic film tube is then heated and is caused to shrink down tightly around the side walls of the electrode stack and at the same time, the protruding ends of the tube shrink down forming the pair of end walls 23, 24. Application of heat and pressure to the end walls 23, 24 establish the final adhesive bond.

FIGS. 2–5 and the corresponding FIGS. 2A–5A, inclusive, illustrate a number of other embodiments of the flat cell construction in accordance with the invention. In all of these embodiments, the cell elements may be basically the same as those just described, that is, the same sintered type positive and negative electrodes may be used together with the same porous, bibulous separators containing the alkaline electrolyte, interposed between the electrodes to form the electrode assembly. For the sake of convenience, the same reference numerals will denote identical cell elements where applicable in the following description.

Figure 2:
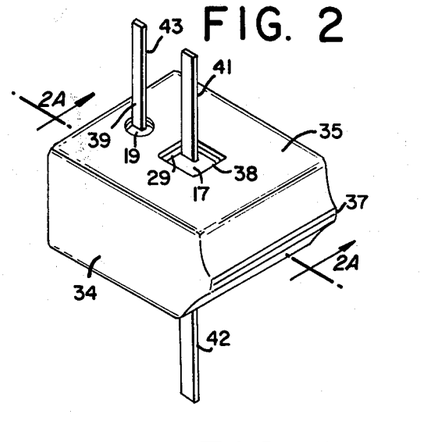
FIG. 2 is a perspective view of another embodiment of the flat alkaline cell construction.
Figure 2A:
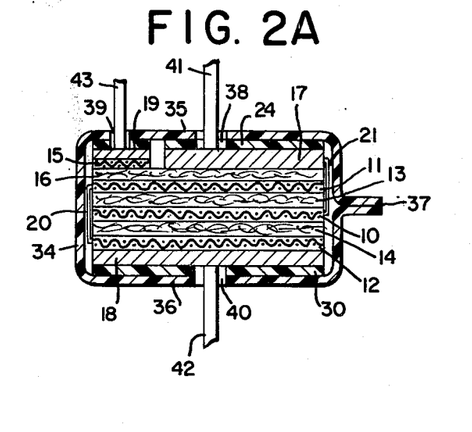
FIG. 2A is a cross-sectional view of the flat cell illustrated in FIG. 2, taken along the line 2A—2A.

In the embodiment of the invention illustrated in FIGS. 2 and 2A, the arrangement of the electrode assembly and the auxiliary electrode 15 and current collector 19 are the same as in the flat cell just described. The cell elements are again enclosed within a sealed, liquid impervious, electrically non-conductive, plastic film envelope 34. This envelope 34 is also made from a heat shrinkable plastic film tube but in this case the tube has one closed and one open end. The tube is heat shrunk tightly around the side walls of the electrode assembly, except that corresponding with the open end of the tube, and also over both ends of the electrode assembly forming the end walls 35, 36. The open end of the tube is then heat sealed together to form the liquid-tight seam 37. The end wall 35 is provided with an opening 38 which exposes a portion of the current collector 17 and also with an opening 39 which exposes the center of the collector 19. In similar fashion, the other end wall 36 is provided with an opening 40 which exposes the center of the collector 18 at the opposite end of the electrode assembly. The collectors 17, 18 and 19 are also coated with the layers 29, 30 and 31 of the same non-wetting adhesive sealant described hereinabove, except for those portions of the collectors which are to be left exposed through the respective openings in the end walls 35, 36. Terminal leads 41, 42 pass through the openings 38, 40 and are secured such as by welding to the exposed portion of each collector 17, 18 which constitutes the positive and negative terminal connections for the cell. Similarly, a third terminal lead 43 passes through the opening 39 and is attached to the collector 19 which constitutes a third terminal connection for the auxiliary electrode 15. After the tube is heat shrunk tightly around the electrode assembly, the end walls 35, 36 are sealed directly to the current collectors 17, 18 and 19 by application of heat and pressure.

Figure 3:
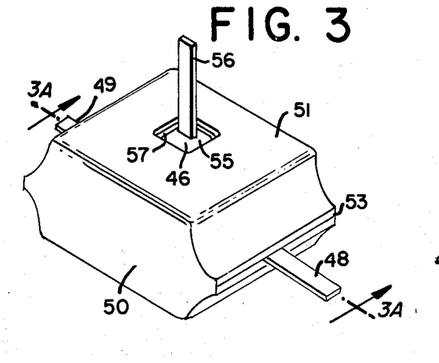
FIG. 3 is a perspective view of another embodiment of the flat alkaline cell construction.
Figure 3A:
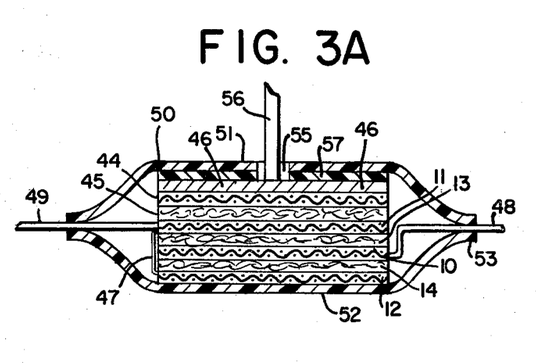
FIG. 3A is a cross-sectional view of the flat cell illustrated in FIG. 3, taken along the line 3A—3A.

In the embodiment of the invention illustrated in FIGS. 3 and 3A, the arrangement of the electrode assembly is again the same as in the flat cells described hereinabove. However, in this flat cell the auxiliary electrode 44 is the same size as the positive electrode plate 10 and negative electrode plates 11, 12. The auxiliary electrode 44 is positioned at one end of the electrode assembly adjacent to the negative electrode plate 11 but is separated therefrom by a porous separator 45. Placed over the auxiliary electrode 44 and in electrical contact therewith is a current collector 46 which may also be a metal plate or foil. Both of the negative electrode plates 11, 12 are interconnected by an insulated metal conductor 47. A terminal lead 48 is secured at one end to the positive electrode plate 10 and another terminal lead 49 is secured to the negative electrode plate 11, such as by welding, the terminal leads extending outwardly from opposite sides of the electrode assembly. The terminal lead 48 constitutes the positive terminal connection and the terminal lead 49 constitutes the negative terminal connection for the cell.

The cell elements are enclosed within a sealed, liquid-impervious, electrically non-conductive, plastic film envelope 50. This envelope 50 is also made from a tubular heat shrinkable plastic film material. In this case, however, the tube is heat shrunk tightly over both ends of the electrode assembly. The envelope 50 is thus formed with side walls 51, 52 and open ends which are heat sealed to one another to form liquid tight seams 53, 54. The open ends of the tube are also sealed around the protruding terminal leads 48, 49.

The envelope 50 is provided with an opening 55 in the side wall 51 which exposes the center of the current collector 46. A metal terminal lead 56 passes through the opening 55 and is secured such as by welding to the collector 46 which constitutes a third terminal connection for the auxiliary electrode 44. A layer 57 of adhesive sealant is applied on the outer surface of the collector 46, except for the small area left exposed through the opening 55, and also around the terminal leads 48, 49 at the point where they protrude through the liquid-tight seams 53, 54. Preferably, the adhesive sealant used is the same fatty polyamide sealant which is non-wettable by the alkaline electrolyte. After heat shrinking the plastic tube as above described, the application of heat and pressure tightly bonds the plastic film to both the collector 46 and the terminal leads 47, 48.

Figure 4:
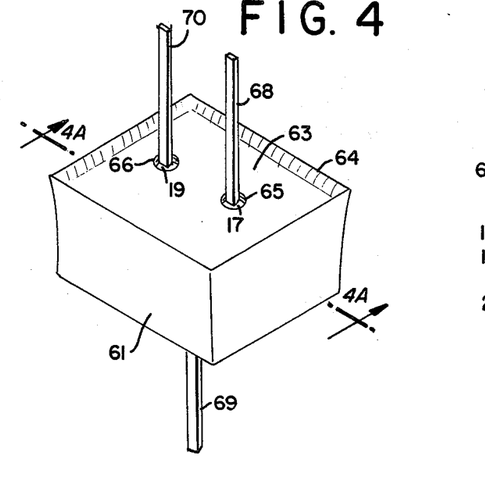
FIG. 4 is a perspective view of still another embodiment of the flat alkaline cell construction.
Figure 4A:
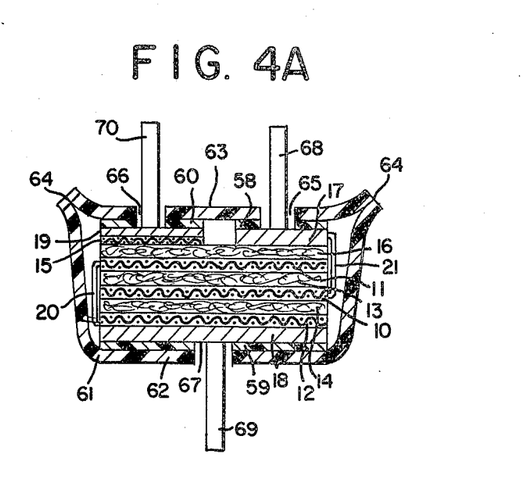
FIG. 4A is a cross-sectional view of the flat cell illustrated in FIG. 4, taken along the line 4A—4A.

FIGS. 4 and 4A illustrate another embodiment of the invention wherein the cell elements are sealed within a liquid impervious, electrically non-conductive, plastic film envelope or housing of a somewhat different construction. The electrode assembly in this embodiment is basically the same as that illustrated in FIGS. 1A and 2A. However, in this flat cell the auxiliary electrode 15, and the current collectors 17 and 19 are each less than half the size of the positive electrode plate 10 and the negative electrode plates 11, 12. The auxiliary electrode 15 and the collector 19 are positioned over the left hand side of the electrode assembly while the collector 17 is positioned over the right hand side of the assembly. A thin layer 58, 59 of the adhesive sealant, preferably a fatty polyamide sealant, is applied to the outer surface of the collectors 17, 18, except for a small area left exposed at the center of each collector. In similar fashion, a thin layer 60 of the adhesive sealant is applied to the outer surface of the collector 19. The electrode assembly is placed inside a rectangular, open ended container 61 which is made of the liquid impervious, electrically non-conductive plastic film. The container 61 includes a bottom wall 62 and may be made, for example, by vacuum forming a flat sheet of the plastic film material. The electrode assembly fits snugly inside the container 61 whose open end is sealed off by a cover 63 also made of the same plastic film material. The cover 63 has its outer peripheral edges heat sealed to the peripheral edges of the container 61 forming a continous liquid-tight seam 64. The cover 63 is provided with a pair of openings 65, 66 through which the centers of current collectors 17, 19 are exposed. The container bottom wall 62 is provided with an opening 67 through which the center of the current collector 18 is exposed. Terminal leads 68, 69 pass through the openings 65, 67 respectively and are secured such as by welding to the center of each of the collectors 17, 18 which constitute the positive and negative terminal connections for the cell. A third terminal lead 70 passes through the opening 66 in the cover 63 and is secured to the center of the current collector 19 constituting a third terminal connection for the auxiliary electrode 15. In the final assembly of the cell, both the cover 63 and the bottom wall 62 are heated and pressure is applied thereto in order to assure that the thin layers 58–60 of adhesive sealant tightly bond the film to each of the current collectors.

Figure 5:
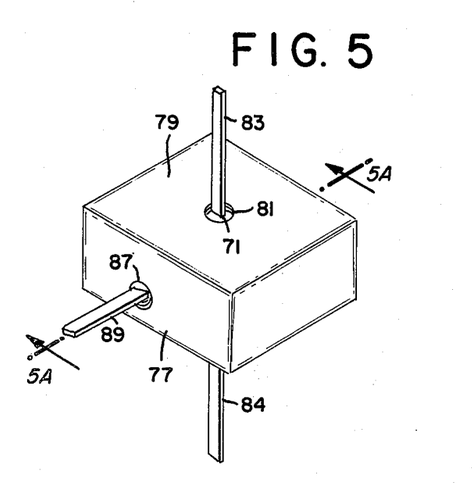
FIG. 5 is a perspective view of a further embodiment of the flat alkaline cell construction.
Figure 5A:
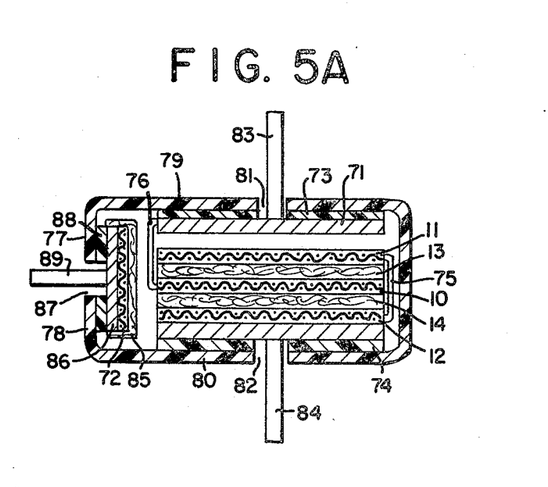
FIG. 5A is a cross-sectional view of the flat cell illustrated in FIG. 5, taken along the line 5A—5A.

The embodiment of the invention illustrated in FIGS. 5 and 5A incorporates still another type of construction for the auxiliary electrode. The electrode assembly is again basically the same as that illustrated in FIGS. 1A and 2A except that the current collector 17 is replaced by a collector 71 which is the same size as the positive electrode plate 10 and the negative electrode plates 11, 12. The arrangement of the auxiliary electrode is however different in this construction. As shown in FIG. 5A, the auxiliary electrode 72 is positioned along side of the electrode assembly. As in the previous flat cells, a thin layer 73, 74 of the adhesive sealant is applied to the outer surface of each of the collectors 71, 18, except for a small area which is left exposed at the center thereof. The pair of negative electrode plates 11, 12 are interconnected by an insulated wire lead 75 while the positive electrode plate 10 is connected to the collector 71 via the insulated wire lead 76. All of the cell elements are enclosed within a sealed envelope 77 which is made from a tube of a heat shrinkable plastic film material. The tube is heat shrunk down over the electrode assembly in the same manner as described for the cell illustrated in FIGS. 1 and 1A forming both side walls 78 and end walls 79, 80. Both end walls 79, 80 overlap the current collectors 71, 18 but leave openings 81, 82, respectively, corresponding with the exposed center of each collector. After the tube has been heat shrunk around the electrode assembly, heat and pressure are applied to the end walls 79, 80, tightly sealing the plastic film to the current collectors 71, 18 through the layers 73, 74 of adhesive sealant. Terminal leads 83, 84 pass through the openings 81, 82 and are secured as by welding to the exposed center of the collectors 71, 18 which constitute the positive and negative terminal connections for the cell.

Auxiliary electrode 72 is separated from the electrode assembly by a porous separator 85 containing the alkaline electrolyte and is secured such as by welding to a current collector 86 which is disposed adjacent to the side wall 78 formed by the plastic tube. This side wall 78 has an opening 87 which exposes the center of the collector 86. Collector 86 is also tightly bonded to the plastic film forming the side wall 78 by a thin layer 88 of the adhesive sealant. A third terminal lead 89 is then attached as by welding to the center of the collector 86.

In cells utilizing the rechargeable nickel-cadmium electrode system, gas generation and the consequent build up of substantial gas pressure inside the cell can occur particularly if the cell is placed on overcharge for long periods of time. On overcharge, oxygen gas initially may be liberated at the positive electrode at a faster rate than it can be recombined at the negative electrode leading to a build up of high internal gas pressure. Hydrogen gas can for example be evolved when the cell is subjected to deep discharge. The evolution of hydrogen gas further increases the gas pressure inside the cell since it does not normally recombine within the cell as does the oxygen.

In flat cells of this invention, the plastic film envelope which is made, for example, of a polypropylene or vinyl film is flexible and fairly weak. The cell can rupture, although without danger, if the internal gas pressure is allowed to build up to any significant level such as 160 psi, for example. In order to avoid this problem, it has been found desirable to provide a mechanism for preventing the generation of hydrogen at the negative electrode while at the same time facilitating the recombination of oxygen. Accordingly, in the preferred embodiment of a rechargeable nickel-cadmium flat cell, the positive and negative electrodes are balanced electrochemically with respect to one another such that the capacity of the negative electrode is greater than that of the positive electrode. Preferably, the capacity of the negative electrode is at least one and one-half times greater than that of the positive electrode and may be as great as three times the positive capacity.

As a further deterrent against cell rupture due to the build up of excessive internal gas pressure, flat cells of the construction disclosed and claimed in our above-referred to copending application may incorporate an auxiliary oxygen or hydrogen sensing electrode together with a third terminal connection in accordance with the invention. In the instance where the auxiliary electrode is an oxygen sensing electrode, the auxiliary electrode forms with the negative electrode a voltage differential whose value will depend on the partial oxygen pressure that is developed inside the cell. Conversely, in the case where the auxiliary electrode is a hydrogen sensing electrode, the auxiliary electrode forms with the positive electrode a voltage differential whose value will depend on the partial hydrogen pressure inside the cell. Under conditions where the cell evolves copious quantities of oxygen gas on overcharge, for instance, the partial oxygen pressure will rise inside the cell, the voltage differential will change and this change can be utilized as a signal for actuating a control device in the charge circuit to cut off the charging current and thereby prohibit the further build up of gas pressure inside the cell. Charging circuits utilizing such control devices are of course well known to those skilled in the art.

In assembling batteries of flat cells of the construction disclosed and claimed in our above-referred to copending application, only one cell incorporates a third terminal connection and an auxiliary oxygen or hydrogen sensing electrode and this cell is utilized as a so-called "control cell," being understood that the remaining battery cells will be maintained in approximately the same state of charge or discharge. Such batteries may be assembled with the flat cells interconnected in series, parallel or series parallel arrangement. In assembling a series-connected battery, for instance, the flat cells may be stacked one on top of another with the positive terminal connection of each cell making electrical contact with the negative terminal connection of the next cell via the terminal leads. The control cell may then be placed at either end of the battery stack of cells in order to more readily facilitate the electrical connection of the control cell into the charging circuit. Other arrangements of the battery assembly and control cell are of course possible as will readily occur to those skilled in the art.

The auxiliary electrode used in the embodiments of the flat cell illustrated in the drawing may be either an oxygen or hydrogen sensing electrode. Preferably, the auxiliary electrode is positioned in close proximity to the negative electrode in the instance where the auxiliary electrode is an oxygen sensing electrode in order to more effectively sense oxygen gas that is liberated at the negative electrode on overcharge. Conversely, the auxiliary electrode is positioned in close proximity to the positive electrode in the instance where the auxiliary electrode is used as a hydrogen sensing electrode. When employed as an oxygen sensing electrode, the auxiliary electrode may be composed of nickel as the active material. The auxiliary electrode when used as a hydrogen sensing electrode may contain a platinum group metal as the active material, such as platinum, palladium or rhodium.

Flat cells utilizing a third terminal connection in accordance with the invention may also incorporate an auxiliary electrode which functions as a voltage reference device. Such applications are particularly useful to the researcher since the auxiliary electrode can be utilized to study the behavior of either the positive or negative electrode without the necessity of disassembling the cell structure. In the embodiments of the flat cell illustrated in the drawing, the auxiliary electrode can be readily utilized as a voltage reference device. It is only necessary to make the proper external electrical connections between the positive or negative and the third terminal connections of the cell. The auxiliary voltage reference electrode in this instance may be composed of a sintered nickel plaque impregnated with metal hydroxide as the active material.

Commercial plastic films which may be utilized in forming the sealed envelope in flat cells of the invention include those made of the following materials: vinyl polymers and copolymers, polyvinylidene chloride, polyethylene, polypropylene, nylon, polysulfone, polystyrene, and fluorocarbon polymers. For use with the preferred fatty polyamide adhesive, films made of polyethylene, polypropylene, and vinyl polymers and copolymers are preferred. Regular and shrink-type films are available in these materials. Desired film characteristics include the following: low cost, flexibility, tear and puncture resistance, chemical stability and resistance to alkaline battery electrolyte, hot-formability, low oxygen gas and water vapor transmission rates, and of course strong surface adherence with fatty polyamide or equivalent adhesive. To reduce the gas and water vapor transmission rate of the plastic film, it may be vacuum metallized or otherwise given a surface metallic coating on one or both sides providing of course the film is not made electrically conductive enough to put a parasitic current drain on the cell.

Although there are probably a number of organic compounds which exhibit a non-wetting characteristic when in contact with an alkaline electrolyte, the most preferred adhesive sealant for use in the practice of the invention are the fatty polyamides. Such fatty polyamide sealants are disclosed in application Ser. No. 392,222 of J. Winger filed on Aug. 28, 1973, which is a continuation of application Ser. No. 167,678, filed on July 30, 1971, and assigned to the common assignee hereof. As disclosed in the copending application, fatty polyamides are produced by reacting a polybasic acid with a polyfunctional amine. Generally, the fatty polyamides useful in the practice of the invention are those having an amine number of above about 9. The amine number is the number of milligrams of KOH equivalent to one gram of fatty polyamide and is determined by procedures well known in the art. The fatty polyamide sealants can be mixed with extenders and modifiers in order to modify the physical properties of the fatty polyamide. In constructing flat cells in accord with the invention, the fatty polyamide sealant can be applied as a hot-melt or from solution in a solvent such as an alcohol/aromatic hydrocarbon mixture. Among the specific commercially available fatty polyamides that are particularly useful in constructing flat cells of the invention are those produced under the tradenames of VERSALON and GENBOND, General Mills, Inc. and Swift's Z-610, Swift and Company.

It has been found that during the assembly of flat cells of the invention the preferred adhesive sealants, i.e., fatty polyamides, do not readily wet some types of plastic film and accordingly a liquid tight seal between the plastic film forming the sealed envelope and the metal collectors is sometimes difficult to attain. This difficulty may be overcome and the bond between the plastic film and the collectors substantially improved if the plastic film is first subjected to successive heat and corona discharge treatments. The process for treating the plastic film is disclosed and claimed in our copending application Ser. No. 456,877, filed on Apr. 1, 1974. In this process, the plastic film is heated to an elevated temperature, about 120°C in the case of a polypropylene film, for a period of about one half minute, optionally cooling the plastic film to ambient temperature and then subjecting the film to a high intensity corona discharge in the area of the film where the collectors are to be adhered.

Although the invention has been described herein with particular reference to rechargeable flat cell systems such as the nickel-cadmium cell wherein an auxiliary electrode is used as an oxygen or hydrogen sensing electrode, it will be understood that the invention is not so limited and is applicable as well to primary flat cells wherein the auxiliary electrode is utilized as a voltage reference electrode.

Primary flat alkaline cells which are believed to be readily adaptable to the flat cell construction herein described include the following: alkaline manganese dioxide-zinc, silver oxide-zinc, and mercuric oxide-zinc.

Electrodes and other materials employed would of course be those required by and compatible with the cell system employed. For example, the collector plates used with the alkaline manganese dioxide-zinc system would preferably be of copper or brass rather than steel. Similarly the flat electrodes employed could be of the well known pressed powder type on an open or expanded conductive substrate rather than of the impregnated porous sinter type.

It is obvious that the flat cell construction of the invention need not be limited to the rectangular format. Other shapes of cell such as square, circular, elliptical, hexagonal, and various irregular figures could be encased in plastic film and provided with a positive, negative and a third terminal connection by the technique herein disclosed.

What is claimed is:

1. A flat alkaline cell comprising an electrode assembly including at least a pair of flat electrode elements of opposite polarity and a porous separator containing an alkaline electrolyte interposed between and in contact with the pair of electrode elements, said electrode assembly being enclosed within a sealed, liquid impervious plastic film envelope having a first, second and third terminal connection, said first terminal connection comprising a current collector disposed adjacent to one end of said electrode assembly in electrical connection with one of said pair of electrode elements and having at least a portion thereof exposed through an opening in one wall of said envelope for making external electrical connection, and a layer of adhesive sealant which is non-wettable by the alkaline electrolyte, tightly adhering and sealing together said current collector and said wall of said plastic film envelope around at least the periphery of said opening, said second and third terminal connections being in electrical connection respectively with the other of said pair of electrode elements and an auxiliary electrode inside said cell.

2. The flat alkaline cell as defined by claim 1, wherein at least one of said second and third terminal connections comprises a separate current collector disposed adjacent to one end of said electrode assembly in electrical connection with at least one of the other of said pair of electrode elements and said auxiliary electrode and having at least a portion thereof exposed through another opening in one wall of said envelope, and wherein a layer of adhesive sealant which is non-wettable by the alkaline electrolyte, tightly adheres and seals together said separate collector and said wall of said plastic film envelope around at least the periphery of said other opening.

3. The flat alkaline cell as defined by claim 1, wherein at least one of said second and third terminal connections comprises a terminal lead affixed at one end to at least one of the other of said pair of electrode elements and said auxiliary electrode, said terminal lead extending outwardly through a liquid tight seam formed by sealing together portions of said plastic film envelope.

4. The flat alkaline cell as defined by claim 1, wherein said layer of adhesive sealant is applied to substantially one entire face of said current collector except for the part thereof which is exposed through said opening for making external electrical connection.

5. The flat alkaline cell as defined by claim 1, wherein said adhesive sealant comprises a fatty polyamide.

6. The flat alkaline cell as defined by claim 1, wherein said sealed envelope is made of a plastic film material selected from the group consisting of polyvinyl chloride, polyvinyl chloride copolymers, polypropylene and polyethylene.

7. The flat alkaline cell as defined by claim 1, wherein said electrode assembly includes at least one flat electrode element containing nickel hydroxide as the positive active material and at least one flat electrode element containing cadmium oxide or cadmium hydroxide as the negative active material.

8. The flat alkaline cell as defined by claim 2, wherein said plastic film envelope is made from a heat shrinkable plastic film tube which is heat shrunk tightly around both ends of said electrode assembly and wherein said opening is located in one wall of said envelope formed by said heat shrunk tube over one end of said electrode assembly.

9. The flat alkaline cell as defined by claim 8, wherein a terminal lead is secured in electrical connection with the portion of said current collector constituting said first terminal connection which is exposed through said opening.

10. The flat alkaline cell as defined by claim 9, wherein a terminal lead is secured in electrical connection with the portion of said separate current collector constituting said second terminal connection which is exposed through said other opening.

11. The flat alkaline cell as defined by claim 9, wherein said third terminal connection comprises a separate current collector disposed adjacent to one end of said electrode assembly in electrical connection with at least one of the other of said pair of electrode elements and said auxiliary electrode and having a portion thereof exposed through still another opening in one wall of said envelope, and wherein a layer of said adhesive sealant tightly adheres and seals together said separate collector and said wall of said envelope at least around the periphery of said other opening.

12. The flat alkaline cell as defined by claim 11, wherein a terminal lead is secured in electrical connection with the portion of said current collector constituting said third terminal connection which is exposed through said other opening.

13. The flat alkaline cell as defined by claim 10, wherein a terminal lead is secured in electrical connection with at least one of the other of said pair of electrode elements and said auxiliary electrode, and wherein said terminal lead extends outwardly through a liquid-tight seam formed by sealing together portions of said envelope.

14. The flat alkaline cell as defined by claim 13, wherein said terminal lead is coated with a layer of adhesive sealant at the point where said lead extends through said liquid-tight seam.

15. A flat alkaline cell comprising, in combination, an electrode assembly including at least a pair of flat electrode elements of opposite polarity and a porous separator containing an alkaline electrolyte interposed between and in contact with the pair of electrode elements, a pair of current collectors, one of which is disposed adjacent to one end of said electrode assembly and the other of which is disposed adjacent to the opposite end of said electrode assembly, each one of said pair of current collectors being in electrical connection with one of the pair of electrode elements of opposite polarity, an auxiliary electrode and a separate current collector positioned in electrical connection with said auxiliary electrode, said electrode assembly, auxiliary electrode and current collectors being enclosed within a sealed, liquid impervious plastic film envelope having openings within the walls thereof which expose a pair of each one of said current collectors for making external electrical connection, and a layer of adhesive sealant which is non-wettable by the alkaline electrolyte, tightly adhering and sealing together each one of said current collectors and the walls of said plastic film envelope.

16. The flat alkaline cell as defined by claim 15, wherein said plastic film envelope is made from a heat shrinkable plastic film tube which is heat shrunk tightly around the side walls of said electrode assembly with the open ends of said tube tightly overlapping each one of said pair of current collectors forming said walls of said envelope and wherein said openings are formed in said overlapping ends of said tube forming said side walls.

17. The flat alkaline cell as defined by claim 16, wherein a terminal lead is secured in electrical connection with the exposed portion of each one of said current collectors.

18. The flat alkaline cell as defined by claim 15, wherein said plastic film envelope is made from a heat shrinkable plastic film tube having one closed end and one open end, said plastic film tube being heat shrunk tightly around both ends of said electrode assembly with the open end of said tube being heat sealed to form a liquid-tight seam and wherein said openings are located in the walls of said envelope formed by said heat shrunk tube over the ends of said electrode assembly.

19. The flat alkaline cell as defined by claim 15, wherein said auxiliary electrode is positioned along side of said electrode assembly.

20. The flat alkaline cell as defined by claim 19, wherein a portion of said separate current collector for said auxiliary electrode is exposed through an opening in the side wall of said plastic film envelope and wherein a layer of said adhesive sealant tightly adheres and seals together said side wall of said envelope and said separate collector at least around the periphery of said opening.

* * * * *

UNITED STATES PATENT OFFICE
CERTIFICATE OF CORRECTION

Patent No. __3,977,906__  Dated __August 31, 1976__

Inventor(s) __T.R. Beatty, H. Vourlis__

It is certified that error appears in the above-identified patent and that said Letters Patent are hereby corrected as shown below:

Column 1, line 52, the word ---past--- should follow the word "creep".

Signed and Sealed this

Twenty-third Day of November 1976

[SEAL]

Attest:

RUTH C. MASON
Attesting Officer

C. MARSHALL DANN
Commissioner of Patents and Trademarks